United States Patent [19]
Ohshima

[11] Patent Number: 5,353,899
[45] Date of Patent: Oct. 11, 1994

[54] DAMPER MECHANISM

[75] Inventor: Kazuyoshi Ohshima, Tokyo, Japan

[73] Assignee: Sugatsune Industrial Co., Ltd., Tokyo, Japan

[21] Appl. No.: 980,795

[22] PCT Filed: Nov. 30, 1991

[86] PCT No.: PCT/JP91/01681
§ 371 Date: Mar. 1, 1993
§ 102(e) Date: Mar. 1, 1993

[87] PCT Pub. No.: WO93/01425
PCT Pub. Date: Jan. 21, 1993

[30] Foreign Application Priority Data
Jul. 4, 1991 [JP] Japan .................. 3-190740

[51] Int. Cl.⁵ ............................... F16F 9/14
[52] U.S. Cl. ........................ 188/310; 188/290
[58] Field of Search .......... 188/306, 307, 308, 309, 188/310, 297, 290; 16/58

[56] References Cited
U.S. PATENT DOCUMENTS

| | | | |
|---|---|---|---|
| 2,286,516 | 6/1942 | Swanson | 188/310 X |
| 2,717,138 | 9/1955 | Sheehan | 188/310 X |
| 3,497,241 | 2/1970 | Jones | 188/306 X |
| 4,274,516 | 6/1981 | Barley | 188/310 |
| 4,666,386 | 5/1987 | Winkler et al. | 188/307 X |

FOREIGN PATENT DOCUMENTS

| | | | |
|---|---|---|---|
| 0507599 | 9/1930 | Fed. Rep. of Germany | 188/307 |
| 3844544 | 12/1989 | Fed. Rep. of Germany | 188/310 |
| 0386013 | 4/1908 | France | 188/306 |
| 0555241 | 3/1923 | France | 188/290 |
| 55-2885 | 1/1980 | Japan . | |
| 61-175637 | 11/1986 | Japan . | |
| 0113926 | 5/1987 | Japan | 188/290 |
| 63-133653 | 9/1988 | Japan . | |
| 3-24346 | 2/1991 | Japan . | |
| 0367888 | 11/1930 | United Kingdom | 188/310 |

Primary Examiner—Andres Kashnikow
Assistant Examiner—Peter M. Poon
Attorney, Agent, or Firm—Jacobson, Price, Holman & Stern

[57] ABSTRACT

A damper mechanism which includes a cylinder with a movable shaft therein with the shaft having a swingable valve on the outer surface. The end of the swingable valve will contact the cylinder when the shaft is rotated in one direction to form a nonreturn valve due to its association with a partitioning member having an oil passage to communicate chambers formed on opposite sides of the partitioning member. When the shaft is rotated in one direction with the valve moving toward the partitioning member, rotational movement of the shaft in that direction will be dampened by restricted movement of oil from one chamber to the other. When the shaft is rotated in the opposite direction, the valve moves away from the cylindrical surface thus enabling unrestricted rotational movement of the shaft in the opposite direction.

9 Claims, 2 Drawing Sheets

DAMPER MECHANISM

BACKGROUND OF THE INVENTION

1. Technical Field

This invention relates to a damper mechanism for generating an effect of damping impact by utilizing the pressure drag of a highly viscous functional oil.

2. Prior Art

A damper mechanism utilizing a functional oil as a damping medium as illustrated in illustrated in FIG. 5 of the accompanying drawings is already known.

The damper mechanism of FIG. 5 comprises a cylinder a, a blade shaft b disposed along the axis of the cylinder a, a blade c filled to the outer peripheral surface of the blade shaft b and designed to slidingly move on the inner peripheral surface of the cylinder a, an upper stationary bearing (not shown) and a lower stationary bearing (not shown) for rotatably holding the blade shaft b, a stationary blade g arranged outside the blade c and a nonreturn valve i disposed in an oil passage h running through the stationary blade g, the inside space d of the cylinder a being divided into two chambers A, B by the blade c, both of the chambers A, B being filled with a functional oil e.

If a relatively large gap exists between the inner peripheral surface a' of the cylinder a and the blade c of a damper mechanism illustrated in FIG. 5, the functional oil e can leak through the gap at an enhanced rate to reduce the damping effect of the mechanism when the blade shaft b is rotated. If, on the other hand, no gap exists therebetween, the blade c becomes incapable of moving smoothly within the cylinder a.

For a damper of the above described type, therefore, there always arises a requirement of reconciling the prevention of leakage of functional oil e and the smooth movement of the blade c.

In order for the requirement to be met, the inner peripheral surface a' of the cylinder a, the blade shaft b, the blade c and other metallic parts of a conventional damper mechanism are subjected to precision machining and precision assembly so that the gap may be made as small as possible.

Obviously such measures can, by turn, pose technical difficulties in machining and assembly of metallic parts and components of the damper mechanism.

Additionally, a conventional damper mechanism as described above is accompanied by the problem of poor durability due to the fact that friction inevitably occurs between the inner peripheral surface a' of the cylinder a and the blade c as the latter slidingly moves on the former until they are abraded and no longer able to operate on a stable basis.

An alternative measure that has been proposed for the prevention of leakage of function oil e consists in providing the blade c with a lining member f and a sealing member.

With such a proposed technique of using a lining member f and a sealing member, the level of precision machining and assembly of metallic parts and components may apparently be reduced.

Such a technique, however, is accompanied by the problem of early abrasion of the lining member f and the sealing member at locations where they are held in contact with the inner peripheral surface a' particularly when the surface a' is coarsely finished.

Therefore, the proposed technique cannot satisfactorily provide a prolonged stability and an enhanced durability of a damper mechanism under consideration.

An additional cost will be involved in the manufacture of a damper mechanism as illustrated in FIG. 5 when an oil passage h is bored through the stationary blade g of the cylinder a and a nonreturn valve i is arranged at the oil passage h.

SUMMARY OF THE INVENTION

In view of the above identified technological problems of existing damper mechanisms, it is therefore an object of the present invention to provide a damper mechanism that can be economically manufactured, stably operates for a prolonged period of time and has an excellent durability.

According to the invention, the above object is achieved by providing a damper mechanism comprising a cylinder, a movable shaft and a movable valve, said movable valve being disposed along said movable shaft and swingable on the outer peripheral surface of said movable shaft, said movable shaft being inserted into said cylinder with said movable valve and rotatable relative to said cylinder, the front end of said movable valve being disposed vis-a-vis the inner peripheral surface of said cylinder and capable of detachably contacting said cylinder to form a nonreturn valve realized by utilizing the movable valve and disposed between the inner peripheral surface of said cylinder and the outer peripheral surface of said movable shaft, a partitioning member being disposed between the inner peripheral surface of said cylinder and the outer peripheral surface of said movable shaft and longitudinally disposed therebetween, the inner space of said cylinder being capable of being divided by the nonreturn valve and the partitioning member into a plurality of chambers having volumes variable relative to each other and held in communication with each other by way of an oil passage bored through the boundary of the chambers, said variable volume chambers being filled with functional oil.

Preferably, the movable valve is flap-shaped and swingably disposed on the outer peripheral surface of the movable shaft by way of a valve holder.

Preferably, the partitioning member is constituted by a block-like partitioning piece projecting from the inner peripheral surface of the cylinder toward the outer peripheral surface of the movable shaft.

The partitioning member may be rigidly fitted to the inner peripheral surface of the cylinder or, alternatively, movably arranged between the inner peripheral surface of the cylinder and the outer peripheral surface of the movable shaft.

When the partitioning member is movably arranged between the inner peripheral surface of the cylinder and the outer peripheral surface of the movable shaft, it may be so disposed in a guide groove formed on the cylinder wall as to be capable of being pushed toward the outer peripheral surface of the movable shaft and retracted toward the inner peripheral surface of the cylinder.

When a such positionally adjustable partitioning member is used, an oil passage for keeping the variable volume chambers in communication with each other may be formed between the front end of the partitioning member and the outer peripheral surface of the movable shaft and the cross section of the oil passage may be variable.

When a positionally adjustable partitioning member is used, the communication between the inner peripheral surface of the cylinder and the outer peripheral surface of the movable shaft may be totally disconnected.

The oil passage connecting the variable volume chambers may alternatively be formed in the partitioning member or the movable valve.

When the oil passage is formed in the partitioning member or the movable valve, the partitioning member or the movable valve will be provided with a through bore.

Alternatively, an oil passage may be formed in the partitioning member and the movable valve at the same time.

When an oil passage is formed in the partitioning member and the movable valve at the same time, the oil passage in the movable valve will have a cross section smaller than that of the oil passage in the partitioning member.

Such an oil passage will normally be a narrow orifice.

Still alternatively, a plurality of combinations of a nonreturn valve and a partitioning member may be provided in the cylinder in a manner same as or similar to the above described one.

When a plurality of combinations of a nonreturn valve and a partitioning member are provided, the inner space of the cylinder is divided into four or more than four variable volume chambers.

When external force is applied clockwise or counterclockwise to the movable shaft of a damper mechanism according to the invention to rotate the movable shaft in the direction of the applied external force, the movable valve fitted to the movable shaft also rotates in the same direction.

As described earlier, the movable valve is detachably contacting the inner peripheral surface of the cylinder to form a nonreturn valve within the cylinder.

The nonreturn valve principally constituted by the movable valve can divide each of the variable volume chambers in the cylinder and be displaced along the inner peripheral surface of the cylinder as the movable shaft is rotated.

Thus, as the movable shaft is rotated and consequently the nonreturn valve is displaced in a manner as described above, the variable volume chambers in the cylinder changes their respective volumes relative to each other so that the nonreturn valve is opened or closed as a function of the flowability and pressure drag of the functional oil generated by the changes in the volumes.

The opening or closing action of nonreturn valve may be best understood by referring to a damper mechanism whose nonreturn valve is opened when the movable shaft is rotated counterclockwise and closed when the movable shaft is rotated clockwise.

With such a nonreturn valve, the movable valve which is a principal component of the nonreturn valve is readily moved away from the inner peripheral surface of the cylinder to open the nonreturn valve under the resistance of the functional oil when the movable shaft is rotated counterclockwise because it is subjected to no external force trying to keep it under a closed condition.

As the nonreturn valve is opened, the functional oil begins to flow from one of the variable volume chambers into the other chamber. Therefore, under this condition, no damping effect is produced there and the movable shaft smoothly rotates counterclockwise.

If, now, the movable shaft is rotated clockwise, the movable valve which is a principal component, of the nonreturn valve is readily moved toward the inner peripheral surface of the cylinder until the former comes into contact with the latter to close the nonreturn valve under the resistance of the functional oil.

As the nonreturn valve is closed, the flow of functional oil is blocked there and, therefore, the volume of one of the variable volume chambers is gradually reduced if the movable shaft is rotated further clockwise. On the other hand, the other variable volume chamber is gradually expanded.

If there were no flow of functional oil under this condition, the movable shaft would stop rotating. Since, however, the functional oil in the variable volume chamber having a reduced volume is allowed to flow through the orifice for passage of oil into the expanding variable volume chamber, the movable shaft is made to slowly rotate as a function of the flow rate of the functional oil.

Thus, a damper mechanism according to the invention produces a given damping effect when the movable shaft is rotated clockwise.

It will be understood that a similar damping effect can be obtained when the cylinder is held stationary and only the movable shaft is made to rotate and compress the functional oil contained in one of the variable volume chamber or, conversely, when the movable shaft is held stationary and only the movable shaft is made to rotate. It will also be understood that a similar effect can be achieved still alternatively, when the cylinder and the movable shaft are made to rotate in opposite directions.

BEST MODE OF CARRYING OUT THE INVENTION

Now, the present invention will be described in greater detail by referring to the accompanying drawings that illustrates a preferred embodiment of the invention.

Figure 1:
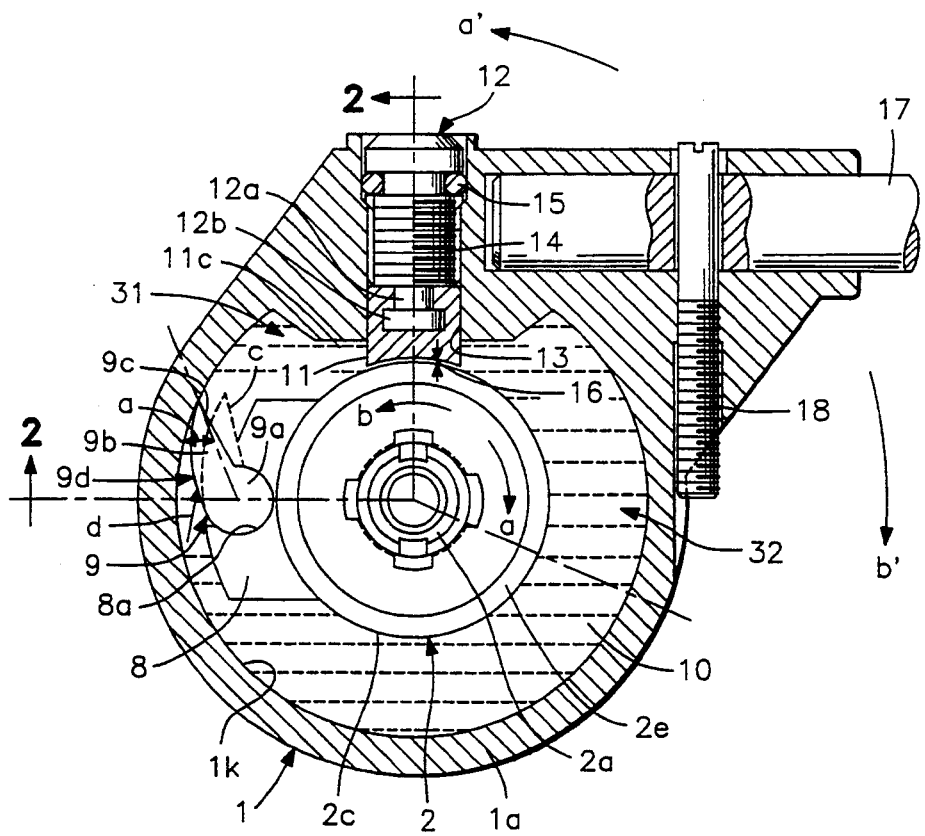
FIG. 1 is a cross sectional view of a preferred embodiment of damper mechanism of the present invention.
Figure 2:
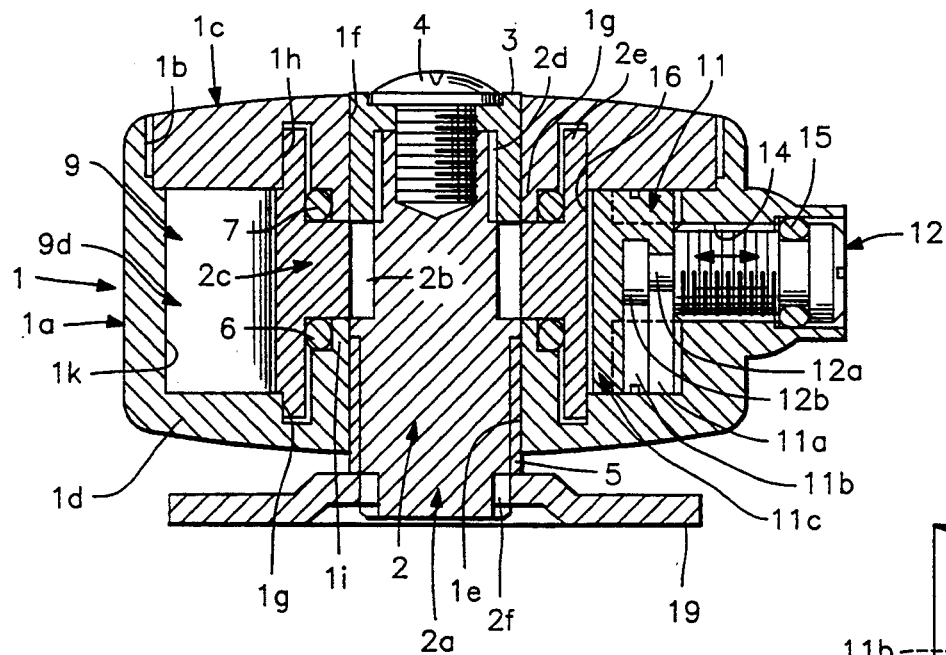
FIG. 2 is a longitudinal sectional view of the embodiment of FIG. 1 cut along line A—A in FIG. 1.
Figure 3:
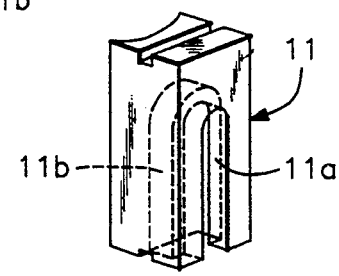
FIG. 3 is a schematic perspective view of the partitioning member of the embodiment of FIG. 1.

Referring to FIGS. 1 through 3, 1 denotes a cylinder, 2 a movable shaft, 3 a bearing, 4 a setscrew, 5 a bearing, 6 and 7 O-rings, 8 a valve holder, 9 a movable valve, 10 a functional oil, 11 a partitioning member, 12 an adjust screw, 13 a guide groove, 14 a tapped hole, 15 an O-ring, 16 an oil passage, 17 an arm, 18 an angle adjust screw, 19 a metal holdfast, 31 and 32 variable volume chambers.

The cylinder 1 comprises a tapped section 1b disposed near an end of the inner peripheral surface and a tubular section 1a disposed close to the other end and provided with a closure 1d at the end and is combined with a circular lid 1c having a threaded outer peripheral surface which is held in engagement with the tapped section 1b.

The closure 1d of the tubular section 1a is provided with a shaft bearing hole 1e, a circular groove 1g and a seal seat 1i while the lid 1c is also provided with a shaft bearing hole 1f, a circular groove 1h and a seal seat 1j.

The tubular section 1a also has a guide groove 13 running on the inner peripheral surface 1k of its thick side wall and a tapped through bore 14 that can bring the guide groove 13 into communication with the outer peripheral surface of the cylinder 1.

The movable shaft 2 comprises an inner shaft member 2a provided with a splined section 2b near an end thereof and a serrated section 2f near the other end and an outer shaft member 2c engaged with the splined section 2b on the outer peripheral surface of the inner shaft member 2a.

The cap-shaped bearing 3 fitted onto the outer peripheral surface of the inner shaft near the upper end thereof is held in engagement with the splined section 2b and rigidly secured to the upper end of the inner shaft 2a by means of the setscrew 4.

The cylindrical outer shaft 2c is provided on its outer peripheral surface 2e with the valve holder 8 having an arcuately recessed holding section 8a.

The movable valve 9 has a flaplike shape and provided with a cylindrical shaft section 9a projecting downward from the bottom.

The shaft section 9a of the movable valve 9 is squeezed into the holding section 8a of the valve holder 8 and pivotally held there.

The partitioning member 11 has a blocklike shape as is illustrated in FIG. 3.

The partitioning member 11 is provided on the inside with a relatively wide engaging groove 11b running from an end of the member substantially to the middle and on the outside with a relatively narrow engaging groove 11a which communicates with the relatively large engaging groove 11b.

The adjust screw 12 which is driven into the partitioning member 11 comprises a neck section 12a disposed near an end thereof and received in the engaging groove 11a and a head section 12b disposed at an end of the neck section 12a and received in the engaging groove 12b.

The above described components will be assembled to a damper mechanism typically in a manner as described below.

In the first step of assembling operation, the lower end of the inner shaft member 2a is introduced into the shaft bearing hole 1e of the tubular section 1a with the interposition of the bearing 5 and the lower end of the outer shaft member 2c is received in the groove 1g of the seal seat 1i of the tubular section 1a with the interposition of the O-ring 6.

Now, the movable shaft 2 is set in position in the cylinder 1.

Thereafter, the shark section of the movable valve 9 is squeezed into the holding section 8a of the valve holder 8.

The movable valve 9 pivotally fitted onto the outer peripheral surface of the movable shaft 2 is now slidingly movable on the inner peripheral surface of (the tubular section 1a of) the cylinder 1 to produce a nonreturn valve 9d between the inner peripheral surface of the cylinder and the outer peripheral surface of the movable shaft.

Referring particularly to FIG. 1, when the movable shaft 2 is rotated counterclockwise (in the direction as indicated by arrow c), the nonreturn valve 9d is released to open itself, whereas it is closed when the movable shaft 2 is rotated clockwise (in the direction as indicated by arrow d).

In the second step, the adjust screw 12 which is holding the O-ring 15 is driven into the tapped through bore 14 of the tubular section 1a.

Now, the neck section 12a and the head section 12b of the adjust screw 12 which is held to the tubular section 1a project into the guide groove 13.

Thereafter, when the partitioning member 11 is squeezed into the guide groove 13 of the tubular section 1a, the engaging grooves 11a, 11b of the partitioning member 11 respectively come to be engaged with the neck section 12a and the head section 12b.

Thus, a partitioning section 11c is formed within the cylinder 1 by the partitioning member 11.

The narrow oil passage 16 is now produced between the inner front end of the partitioning member 11 and the outer peripheral surface of the outer shaft member 2c of the movable shaft 2 as the inner end of the partitioning member 11 is brought close to the outer peripheral surface of the movable shaft 2.

The position of the partitioning member 11 can be adjusted to enlarge or narrow the oil passage 16 by moving the member 11 in either direction of the arrow in FIG. 2 by means of the adjust screw 12.

Thus, the inner space of the cylinder 1 is divided into two variable volume chambers 31, 32 by the nonreturn valve 9d and the partitioning section 11c and the two variable volume chambers 31, 32 are held in communication with each other by way of the oil passage 16.

The variable volume chambers 31, 32 are filled with functional oil in this stage of assembling operation.

In the final stage of assembling operation, the lid 1c carrying the O-ring 7 on its seal seat 1j is fitted to the opening of the tubular section 1a to airtightly seal the inner space of tile cylinder 11 by way of the mutual engagement of the tapped section 1b and the corresponding threaded section (not designated by a reference symbol).

Under this condition, a top portion of the inner shaft member 2a that carries the bearing 3 is squeezed into the shaft bearing hole 1f while a top portion of the outer shaft member 2c is squeezed into the groove 1h of the lid 1c.

The arm 17 is fitted to the outer periphery of (the tubular section 1a of) the cylinder 1 by means of the angle adjust screw 18 and the metal holdfast 19 is fitted to the serrated shaft section 2f of (the inner shaft member 2a of) the movable shaft 2 projecting out of the (tubular section 1a of) the cylinder 1.

All the components and members of a damper mechanism according to the invention are made of metal and/or hard synthetic resin except the sealing members which are made of rubber or synthetic resin of a known type.

The functional oil 10 may be any viscous fluid (oil) or oily viscous and elastic fluid selected from silicon oil, grease and high molecular substances.

The above described embodiment of damper mechanism of the present invention may be modified in various ways.

A possible modification is that the partitioning member 11 is rigidly secured to the inner peripheral surface 1k of the cylinder 1.

With such an arrangement, a through bore is bored through either the movable valve 9 or the partitioning member 11 and serves as an oil passage 16.

Another modification is that both the movable valve 9 and the partitioning member 11 are provided with an oil passages 16.

With such an arrangement, the oil passage through the movable valve 9 has a cross section smaller than that of the oil passage through the partitioning member 11.

Still another possible modification is that a plurality of combinations of a nonreturn valve 9d and a partitioning section 11c are arranged in a manner same as or similar to that of arrangement of the above described embodiment.

With such an arrangement, the inner space of the cylinder 1 is divided into four or more than four variable chambers.

Figure 4:
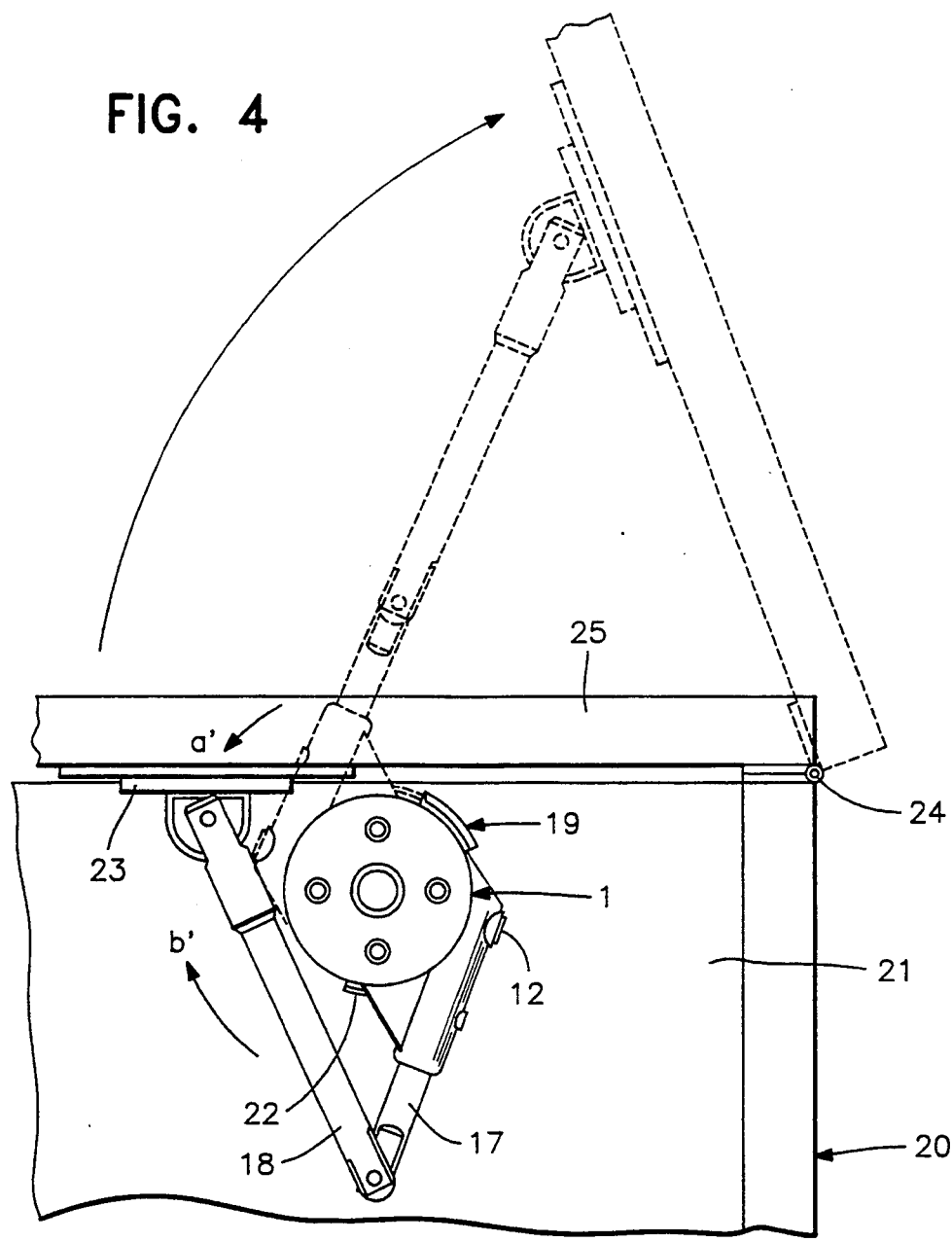
FIG. 4 is a lateral elevation view of a swing system incorporating the embodiment of FIG. 1.
Figure 5:
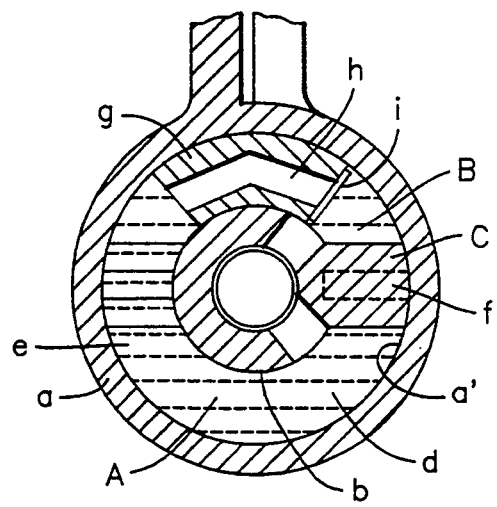
FIG. 5 is a cross sectional view of a conventional damper mechanism.

FIG. 4 illustrates a swing lid (door) to which the embodiment of damper mechanism of the invention is applied.

In FIG. 4, an arm 22 is articulated at an end to a corresponding end of another arm 17 whose other end is rigidly secured to the cylinder of the damper mechanism while the other end of the arm 22 is pivotally connected to a metal holdfast 23.

A cabinet 20 as illustrated in FIG. 4 is provided at an edge of its opening 21 with a swing lid 25 which is anchored to the cabinet 20 by means of a hinge 24.

The metal holdfast 19 is rigidly secured to the inner surface of a lateral wall of the cabinet 20 near the opening 21 by means of screws. The metal holdfast 23 is, on the other hand, rigidly secured to the lower surface of the swing lid 25 by means of screws.

Thus, the damper mechanism comprising the arms 17, 22 and other components operates like an elbow disposed between a portion of a lateral wall of the cabinet 20 near the opening of the cabinet 20 and the swing lid 25.

If the swing lid 25 is turned from its closed position as indicated by solid lines in FIG. 4 to an open position as indicated by phantom lines in FIG. 4, the cylinder 1 is rotated by means of the arms 17, 22 in a direction as shown by arrow b' relative to the movable shaft 2 which is rigidly secured to a lateral wall of the cabinet 20 near the opening 21 by means of the metal holdfast 19.

As the cylinder 1 is rotated, the nonreturn valve 9d is opened to allow the functional oil 10 contained in the variable volume chamber 32 to smoothly flow into the other variable volume chamber 31 so that the lid 25 is turned open without any substantial resistance.

If, then, the swing lid 25 of the cabinet 20 is turned back from the open position as indicated by phantom lines to the closed position as indicated by solid lines in FIG. 4, the cylinder 1 is rotated in a direction as shown by arrow a' which is opposite to the direction shown by arrow b'.

As the cylinder 1 is rotated, the nonreturn valve 9d is closed and the variable volume chamber 31 is compressed by the movable valve 9 whereas the other variable volume chamber 32 is expanded to an equal extent.

Under this condition, since the functional oil 10 contained in the compressed variable volume chamber 31 is partly fed to the expanded variable volume chamber 32 by way of the oil passage 16 the movable shaft 2 is slowly rotated to softly close the lid 25.

The angular speed of the movable shaft 2 and that of the lid 25 are determined by the flow rate of functional oil running through the oil passage 16.

Thus, the angular speed of the closing lid 25 can be appropriately selected by moving the inner front end of the partitioning member 11 closer to or away from the outer peripheral surface of the movable shaft 2 and therefore by adjusting the cross section of the oil passage 16.

A damper mechanism according to the invention and capable of exerting an above described damping effect can advantageously find various applications where a component of a structure is rotated in two opposite directions and the rotation of the component is natural in a given direction whereas the rotation in the other direction need to be controlled.

Industrial Applicability

As described above, a damper mechanism according to the invention has a simple configuration of comprising a movable shaft housed in a cylinder along with a nonreturn valve, a partitioning member and an oil passage and the variable volume chambers formed within the cylinder and separated by the nonreturn valve and the partitioning member are filled with functional oil.

A damper mechanism according to the invention produces an effect of damping any rotary movement of the movable shaft when the movable shaft is rotated in a given direction.

Thus, it is only a movable valve which is a principal component of the nonreturn that is subjected to contact and friction with the inner peripheral surface of the cylinder while the damper mechanism is operated, whereas any other components thereof are practically not subjected to friction.

Moreover, the movable valve is subjected to contact with the inner peripheral surface of the cylinder only when the damper mechanism produces a damping effect and, because the contact between the movable valve and the cylinder is very soft and mild, either of them will not be abraded.

Additionally, since the movable valve operates as a blade for driving functional oil to flow and as a nonreturn valve for blocking the flow of functional oil, the overall number of components of such a damper mechanism is advantageously reduced.

Thus, a damper mechanism according to the invention can be economically manufactured, stably operates for a prolonged period of time and has an excellent durability. Such a damper mechanism can advantageously find various applications where a damping effect is required.

What is claimed is:

1. A damper mechanism comprising a cylinder having an inner peripheral surface, a movable shaft having an outer peripheral surface and a movable valve, said cylinder including an internal volume filled with functional oil, said movable valve being disposed along said movable shaft and swingable on the outer peripheral surface of said movable shaft for movement toward and away from the inner peripheral surface of said cylinder, said movable shaft being inserted into said cylinder with said movable valve and rotatable relative to said cylinder, a front end of said movable valve being disposed vis-a-vis the inner peripheral surface of said cylinder and contacting the inner peripheral surface of said cylinder to form a nonreturn valve disposed between the inner peripheral surface of said cylinder and the outer peripheral surface of movable shaft to dampen movement of the shaft when the shaft is rotated in one rotational direction, the front end of said movable valve being moved out of engagement with the inner peripheral surface of the cylinder to form a return valve to enable unrestricted movement of the shaft when the shaft is rotated in an opposite direction of rotation, a partitioning member disposed between the inner peripheral surface of said cylinder and the outer peripheral surface of said movable shaft and longitudinally disposed therebetween, an inner space of said cylinder being divided by the nonreturn valve and the partitioning member into a plurality of chambers having volumes variable relative to each other, said chambers being communicated with each other by an oil passage through a boundary of the chambers to control flow of functional oil between the chambers when the shaft is rotated in said one direction to dampen rotation of the shaft when the shaft is rotated in said one direction.

2. A damper mechanism according to claim 1, wherein the inner space of the cylinder is divided into at least two variable volume chambers by at least one combination of a nonreturn valve and a partitioning member.

3. A damper mechanism according to claim 1, wherein the movable valve is flap-shaped and swingably disposed on the outer peripheral surface of the movable shaft by way of a valve holder.

4. A damper mechanism according to claim 1, wherein the partitioning member is constituted by a block-like partitioning piece projecting from the inner peripheral surface of the cylinder toward the outer peripheral surface of the movable shaft.

5. A damper mechanism according to claim 4, wherein the partitioning member is so fitted to the inner peripheral surface of the cylinder as to be movable between the inner peripheral surface of the cylinder and the outer peripheral surface of the movable shaft.

6. A damper mechanism according to claim 4, wherein said oil passage is formed between the front end of the partitioning member and the outer peripheral surface of the movable shaft to keep the variable volume chambers in communication with each other.

7. A dampener for restricting rotational movement of a shaft in one direction and enabling unrestricted rotation of the shaft in an opposite direction, said dampener comprising a housing having an interior cylindrical surface, a rotatable shaft extending into said housing in spaced relation to the cylindrical surface, a valve member mounted on said shaft for movement toward and away from the interior cylindrical surface on the housing, a partitioning member mounted on the housing and extending toward the shaft and terminating in adjacent relation thereto, the interior of the housing being filled with a viscous fluid, said partitioning member being spaced from the valve member and dividing the space between the shaft and interior cylindrical surface on the housing into a pair of chambers which can vary in volume, said valve member being movable toward and into contact with the interior cylindrical surface on the housing during rotation of the shaft in one direction to move the valve member toward the partitioning member, said partitioning member including an oil passage restricting flow of viscous fluid past the partitioning member thereby dampening rotational movement of said shaft in said one direction, said valve member being moveable toward the shaft and out of contact with the interior cylindrical surface on the housing when the shaft is rotated in an opposite direction to enable unrestricted rotational movement of said shaft when the shaft is rotated in said opposite direction.

8. The dampener as defined in claim 7 wherein said valve member is pivotally supported from said shaft for swinging movement about an axis parallel to a longitudinal axis of said shaft, said valve member including an outer end having a curved surface engageable with the interior cylindrical surface on the housing to form a nonreturn valve when the shaft is rotated in said one direction and being moved back toward the shaft by the viscous fluid when the shaft is rotated in the opposite direction.

9. The dampener as defined in claim 7 wherein said oil passage is a space provided between the shaft and an inner end of said partitioning member.

* * * * *